United States Patent [19]

Gunesin et al.

[11] Patent Number: 4,781,295

[45] Date of Patent: Nov. 1, 1988

[54] CONTAINER MADE FROM POLYSTYRENE FOAMS CONTAINING POLYETHYLENE

[75] Inventors: Binnur Z. Gunesin, Warren; Viren P. Trivedi, Old Bridge, both of N.J.

[73] Assignee: Mobil Oil Corporation, New York, N.Y.

[21] Appl. No.: 150,482

[22] Filed: Feb. 10, 1988

Related U.S. Application Data

[63] Continuation of Ser. No. 685,587, Dec. 24, 1984, abandoned.

[51] Int. Cl.$^4$ .............................................. B65D 65/38
[52] U.S. Cl. .................................. 206/524.6; 53/441; 53/461; 206/45.33; 426/111; 426/396
[58] Field of Search ................... 53/441, 442, 461; 206/45.33, 524.6; 229/2.5 R, 3.5 R; 426/106, 111, 396, 410, 411, 413; 521/59; 525/221, 222, 227, 237, 240

[56] References Cited

U.S. PATENT DOCUMENTS

| | | | |
|---|---|---|---|
| 3,287,286 | 11/1966 | Ohlinger | 521/59 |
| 3,474,051 | 10/1969 | Chappelear | 521/59 |
| 3,520,834 | 7/1970 | Mitzutani et al. | |
| 3,894,117 | 7/1975 | Agouri et al. | 525/240 |
| 4,058,247 | 11/1977 | Florian | 229/2.5 R |
| 4,237,190 | 12/1980 | McGee | 525/240 |
| 4,255,531 | 3/1981 | Arbit | 525/221 |
| 4,503,187 | 3/1985 | Gunesin et al. | 525/240 |

FOREIGN PATENT DOCUMENTS 0109331 6/1984 Japan ................................. 521/59

OTHER PUBLICATIONS

"Polyethylenes"; Estes, P. H.; *Machine Design-Plastics by Penton;* dated 11/13/1967.

*Primary Examiner*—Jimmy G. Foster
*Attorney, Agent, or Firm*—Alexander J. McKillop; Michael G. Gilman; Michael J. Mlotkowski

[57] ABSTRACT

The impact strength of containers made from foams of aromatic olefins such as polystyrene and poly-(para-methylstyrene) is improved by the addition of a small amount e.g., 2 to 25 weight percent of a polyethylene such as linear low density polyethylene. Meat trays made of such foams can be processed in automatic packaging equipment and exhibit reduced damage, such as cracking, in processing.

5 Claims, No Drawings

CONTAINER MADE FROM POLYSTYRENE FOAMS CONTAINING POLYETHYLENE

This is a continuation of copending application Ser. No. 685,587, filed on Dec. 24, 1984 now abandoned.

BACKGROUND OF THE INVENTION

Foamed polystyrene trays are widely used in the packaging of edible products, such as meat, cheese and fruit. Typically, such trays are packaged on automatic equipment by wrapping the tray with a clear film. A persistent problem with such trays is cracking during the wrapping operation or afterwards, particularly in the corners of the tray. This necessitates using heavier gauge foam, an additional expense, or the use of special designs, such as disclosed in U.S. Pat. No. 4,058,247, which is incorporated herein by reference. In accordance with this invention, the cracking problem in such foamed trays is alleviated by using the polyethylene additive in the polystyrene foam.

Polystyrene foams containing low density polyethylene, especially suitable for formation of blow molded articles are described in U.S. Pat. No. 3,520,834 which is incorporated herein by reference in entirety. Foams of poly(para-methylstyrene) containing polyethylene homopolymers or copolymers are described in U.S. Pat. No. 4,255,531 which is also incorporated herein by reference. The purpose of the polyethylene in U.S. Pat. No. 4,255,531 is to enhance cross-linking when the composition is irradiated. It is not intended that the compositions of this invention be irradiated and they need not be so treated to be entirely effective for the purpose intended herein.

SUMMARY OF THE INVENTION

Foamed plastic trays of rectangular shape adapted for packaging of edible products by overwrapping with a plastic film on automatic equipment comprising foamed polystyrene or foamed poly(para-methylstyrene) are improved by adding a small amount of a low density polyethylene homopolymer or copolymer. The added polyethylene reduces cracking of the tray during and after overwrapping.

DETAILED DESCRIPTION OF THE INVENTION

The improved compositions of this invention are suitable for use in a variety of known trays for the packaging of foods in which the tray is overwrapped in an automatic packaging machine. Polystyrene foam is the material of choice for this purpose. However, polymers with similar properties such as poly(para-methylstyrene) can also be used.

Poly(para-methylstyrene) polymers are described in U.S. Pat. No. 4,176,144 which is incorporated herein by reference in entirety. Such polymers exhibit certain advantages over polystyrene in many applications but are not widely commercially available at this time. Therefore, polystyrene remains the material of choice for the commercial application of this invention.

The polyethylene polymer which is added to achieve the reduced cracking of the trays of this invention can be a low density polyethylene prepared by the high pressure process or a low density copolymer of ethylene and a higher olefin. Both high pressure resins (LDPE) and linear low density polyethylene (LLDPE) resins are commercially available.

Suitable LLDPE resins are described in U.S. Pat. No. 4,076,698 which is incorporated herein by reference. These LLDPE resins are generally copolymers of ethylene and higher olefins having 4 to 8 carbon atoms. Ethylene copolymers with 1-butene, 1-hexene and 1-octene are advantageously used. The low density ethylene polymer is used in amounts sufficient to achieve its desired effect of reducing cracking. Generally, this amount is in the range of 2 to 25 weight percent and preferably 2 to 10 weight percent. Amounts of linear low density polyethylene in the range of 4 to 6 percent have been found to be suitable in practical tests in which meat trays have been made and tested on automatic wrapping equipment. Equipment of this type is widely used particularly in supermarkets. Manufacturers include Weldatron and Hobart.

The foams of this invention can be formed into trays by any suitable method. A typical commercial method involves the formation of a foam sheet by extrusion of the polymer mixture with a blowing agent such as isopentane and the subsequent thermal formation of the foam sheet into a container of the desired configuration. Generally, the foamed sheet is 90 to 100 mil in thickness, and its thickness increases during thermoformation to 150 to 170 mils. The foams of this invention also exhibit improved environmental stress crack resistance which is an advantage for trays which are used for packaging oily or fatty foods.

The use of the compositions of this invention offers the prospect of reducing the thickness of the foam typically used for polystyrene while reducing the cracking problem, thereby saving plastic material.

The invention is illustrated by the following non-limiting examples.

EXAMPLES 1-3

Polystyrene resin was compounded with various amounts of linear low density polyethylene (LLDPE) in a 25 lb. size Banbury mixer. The polystyrene (PS1800) was a 1.7 melt index (M.I.) high heat grade crystal resin. The LLDPE was copolymer of ethylene and butene (Melt Index = 1). The blends were injection molded to ASTM test specimens. The physical properties were as follows.

| EXAMPLE | C | 1 | 2 | 3 |
|---|---|---|---|---|
| PS/LLDPE Ratio | 100% | 95/5 | 85/15 | 75/25 |
| (G) g/10 min. | 1.7 | 2.6 | 2.8 | 3.0 |
| Vicat. °C. | 108 | 108 | 108 | 108 |
| 1200 Impact ($\frac{1}{4}$") Ft. lb/inch | 0.17 | 0.22 | 0.24 | 0.39 |

EXAMPLE 4

A blend of 95 weight percent polystyrene (PS) and 5 weight percent LLDPE as in Example 1 above was foamed on a 2½ to 3½ inch Tandem pilot line with isopentane as a blowing agent. The foam sheet (about 100 mil thick), and meat trays thermoformed from the sheet (with a bottom gauge of about 165 mil) were compared against the polystyrene control for tensil and flexual properties, and trays were subjected to end use tests. The blend sheet exhibited an ultimate toughness in the machine direction 12–13% higher than the control (6.2 vs. 5.5 in-lb). The flexual properties of the thermoformed sheet of the blend is about 6% higher than the control (144 vs. 136 psi).

The end use as a meat tray was tested on an Weldotron automatic packaging machine by wrapping the tray containing simulated product with a plastic film in the conventional manner. For twenty samples the trays made from the blend gave 95% acceptable and 5% marginal performance. The control trays gave 60% acceptable and 40% unacceptable performance due to cracking, particularly at the corners.

Although the present invention has been described with preferred embodiments, it is to be understood that modifications and variations may be restored to, without departing from the spirit and scope of this invention, as those skilled in the art will readily understand. Such modifications and variations are considered to be within the purview and scope of the appended claims.

We claim:

1. A method of using a generally rectangular tray of thermoplastic foamed material to package food by overwrapping the food and the tray with a plastic film on automatic packaging equipment; in which said thermoplastic foamed material comprises a foamed polymer blend of 75 to 98 weight percent polystyrene and 2 to 25 weight percent of low density polyethylene homopolymer or copolymer sufficient to reduce cracking of the tray during and after overwrapping, compared to a polystyrene tray without said low density polystyrene.

2. The method of claim 1 in which said polymer blend comprises polystyrene and a linear low density copolymer of ethylene and a higher olefin having 4 to 8 carbon atoms.

3. The method of claim 1 in which said polymer blend comprises polystyrene and a low density polyethylene.

4. The method of claim 1 in which said low density polyethylene polymer comprises 2 to 10 weight percent of said blend.

5. The method of claim 1 in which said tray is thermoformed from a extruded foam sheet having a thickness of 90 to 100 mil.

* * * * *